(12) United States Patent
Lin et al.

(10) Patent No.: US 7,899,752 B2
(45) Date of Patent: Mar. 1, 2011

(54) METHOD AND SYSTEM FOR PREVENTING SKIPPING PLAYBACK OF A SPECIAL CONTENT SECTION OF A DIGITAL MEDIA STREAM

(75) Inventors: Yong Hua Lin, Beijing (CN); Guo Hui Lin, Beijing (CN); Yu Dong Yang, Beijing (CN); Yu Yuan, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 737 days.

(21) Appl. No.: 11/752,358

(22) Filed: May 23, 2007

(65) Prior Publication Data

US 2008/0027864 A1    Jan. 31, 2008

(30) Foreign Application Priority Data

Jul. 25, 2006    (CN) .................... 2006 1 0107759

(51) Int. Cl.
*G06F 21/00*    (2006.01)
(52) U.S. Cl. .......................................... 705/51; 705/50
(58) Field of Classification Search ............... 705/50–51
See application file for complete search history.

(56) References Cited

U.S. PATENT DOCUMENTS 6,351,439 B1    2/2002    Miwa et al.

(Continued)

FOREIGN PATENT DOCUMENTS

WO    WO02/07362 A1 *    1/2002

OTHER PUBLICATIONS

"A Joint Signal Processing and Cryptographic Approach to Multimedia Encryption", Yinian Mao and Min Wu, IEEE Transactions on Image Processing, vol. 15, No. 7, Jul. 2006, 15 pages.*

*Primary Examiner*—Calvin L Hewitt, II
*Assistant Examiner*—James D Nigh
(74) *Attorney, Agent, or Firm*—Gibb I.P. Law Firm, LLC (57) ABSTRACT

A method and system for preventing skipping the playback of a special content section of a digital media stream is provided. The method comprises a method for providing a digital media stream on the providing side, and a method for playing back a digital media stream as provided by the above providing method on the playing back side. The providing method comprises: decoding an encoded special content section of a digital media stream; generating an encryption key based on the decoded data of the special content section; encrypting a normal content section of the digital media stream using the encryption key; and providing the digital media stream comprising the encoded special content section and the encrypted normal content section. The playback method comprises: receiving the digital media stream; decoding the special content section of the digital media stream; generating an encryption key based on the decoded data of the special content section by using the same method for generating the encryption key in providing the digital media; decrypting the normal content section of the digital media stream using the encryption key; and playing back the special content section and normal content section of the digital media stream.

15 Claims, 6 Drawing Sheets

U.S. PATENT DOCUMENTS

| | | |
|---|---|---|
| 6,530,021 B1 | 3/2003 | Epstein et al. |
| 7,245,720 B2 * | 7/2007 | Wajs .......................... 380/210 |
| 7,480,635 B2 * | 1/2009 | Saar et al. ..................... 705/50 |
| 2002/0168963 A1 * | 11/2002 | Wajs .......................... 455/411 |
| 2003/0044061 A1 * | 3/2003 | Prempraneerach et al. .. 382/164 |
| 2003/0192060 A1 | 10/2003 | Levy |
| 2004/0005143 A1 | 1/2004 | Tsuru et al. |
| 2004/0028226 A1 * | 2/2004 | Saar et al. ................... 380/200 |
| 2004/0168207 A1 | 8/2004 | Kelly et al. |
| 2008/0317278 A1 * | 12/2008 | Lefebvre et al. ............ 382/100 |

* cited by examiner

METHOD AND SYSTEM FOR PREVENTING SKIPPING PLAYBACK OF A SPECIAL CONTENT SECTION OF A DIGITAL MEDIA STREAM

TECHNICAL FIELD

The present invention relates to the field of digital media, and in particular, to a method and system for preventing skipping playback of a special content section of a digital media stream.

BACKGROUND OF THE INVENTION

In typical digital media playback scenarios, for example, Digital TV Program Recorder, DVD, etc., the content player (application software or device) will generally have the capability to manually skip some content sections that the end user has little intention to watch or hear. However, these skipped content sections may represent an important value to the content owner or may be required by the law. For example, commercial advertisements, copyright declarations, legal notices, etc. Thus these content sections are required not to be skipped usually.

The usual approach to preventing skipping these special content sections is by requiring the content player to ignore the end users' skipping command over these special sections. This would demand the content player to follow some implementing requirements. As such, a player that is not implemented strictly following the requirements would be able to skip these special content sections. While we could enforce certification on a commercial player, the diversity of the market and also the free available players result in a weak or no control over the player's implementation. Therefore this approach to preventing skipping a special content section of a media stream is not effective in many cases.

Figure 1:
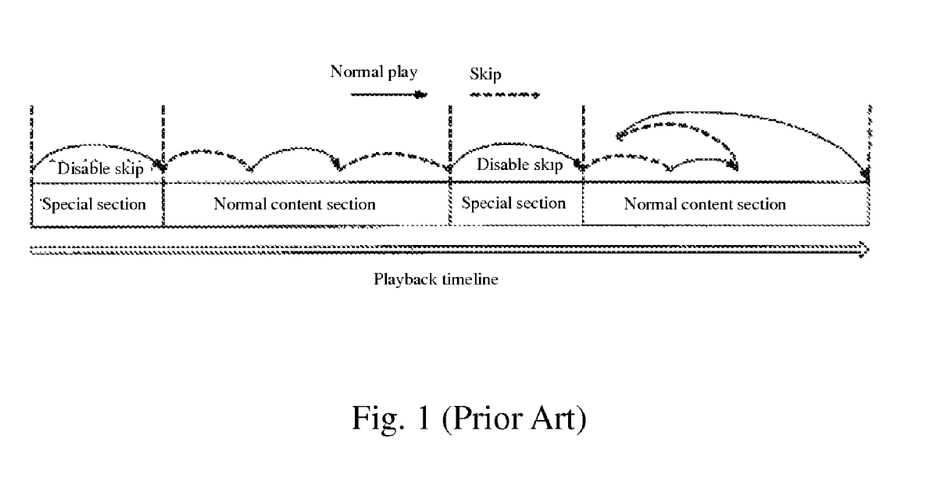
FIG. 1 is a schematic diagram illustrating the playback sequence of content sections in a digital media stream in a method for preventing skipping the playback of a special content section of a digital media stream in the prior art.

FIG. 1 shows an example of a typical content playback operation sequence, where the special content sections are expected to be played back before the normal contents sections can be played back. This requires the inventor to disable the skipping function of the player over these special sections and enable it when the player comes to the normal content sections.

A better approach to this problem is to establish such relationships between the various sections of the media content itself that the playback of normal sections of media content would depend on the playback of the special sections of media content required to be played back. Thus, even those media players not complying with the specifications cannot play back the contents on which such a relationship have been imposed.

The US patent application No. 2004/0028226, entitled "Method for Financing Multimedia Content Through Advertising", discloses such a method for preventing skipping advertisements in media content, wherein first the encryption key of a normal content section is generated, then the encryption key is embedded in the special content section such as advertisement or commercial content using digital watermark or other techniques before the special content section is encoded, and finally the encryption key is used to encrypt the subsequent normal content section. Thus, only after the data of the advertisement or commercial content has been scanned, can the encryption key be retrieved to encrypt the subsequent normal content section.

However, there are still some disadvantages in the method of this patent application. Using this method, decoding the content of the special section, embedding the encryption key therein, and re-encoding the content of the special section are generally unavoidable. And as is well known in the art, re-encoding content requires much more computing power than simple decoding, thus increasing the cost of content production. And, since most content encoding algorithms is lossy, re-encoding the content will introduce more distortions to the content, thus the quality of the content will be degraded. Further, due to the embedded encryption key information, the content to be re-encoded may need to be encoded with a higher bit rate in order to retain the encryption key information during the lossy compression process, thus increasing the data size. Moreover, if the special content section contains some special information from the original content creator, the above process could completely destroy that information, thus violating the content use agreement.

Therefore, apparently a need exists in the art for a method and system for preventing skipping the playback of a special content section of a digital media stream, which can overcome the above mentioned disadvantages.

SUMMARY OF THE INVENTION

According to a first aspect of the present invention, there is provided a method for providing a digital media stream, wherein the digital media stream comprises a first content section and a second content section, the method comprising the steps of: decoding the encoded first content section; generating an encryption key based on the data of the decoded first content section; encrypting the second content section of the digital media stream using the encryption key; and providing the digital media stream comprising the encoded first content section and the encrypted second content section.

According to another aspect of the present invention, there is provided a method for playing back a digital media stream as provided by the above method for providing a digital media stream, comprising the steps of: receiving the digital media stream; decoding the first content section of the digital media stream; generating an encryption key based on the decoded data of the first content section by using the same method for generating the encryption key in providing the digital media; decrypting the second content section of the digital media stream using the encryption key; and playing back the first content section and second content section of the digital media stream.

According to another aspect of the present invention, there is provided a method for preventing skipping the playback of a first content section of a digital media stream during the playback of the digital media stream, comprising: the above method for providing a digital media stream on the providing side of the digital media stream; and the above method for playing back a digital media stream on the playback side of the digital media stream.

According to another aspect of the present invention, there is provided an apparatus for providing a digital media stream, wherein the digital media stream comprises a first content section and a second content section, the apparatus comprising: a decoding module for decoding the encoded first content section; an encryption key generation module for generating an encryption key based on the decoded data of the first content section; an encryption module for encrypting the second content section of the digital media stream using the encryption key; and a providing module for providing the digital media stream comprising the encoded first content section and the encrypted second content section.

According to another aspect of the present invention, there is provided an apparatus for playing back a digital media stream as provided by the above method for providing a digital media stream, comprising: a receiving module for receiving the digital media stream; a decoding module for decoding the first content section of the digital media stream; an encryption key generation module for generating an encryption key based on the decoded data of the first content section by using the same method for generating the encryption key when providing the digital media; a decryption module for decrypting the second content section of the digital media stream using the encryption key; and a playback module for playing back the first content section and second content section of the digital media stream.

According to another aspect of the present invention, there is provided a system for preventing skipping the playback of a first content section of a digital media stream during the playback of the digital media stream, comprising: the above apparatus for providing a digital media stream on the providing side of the digital media stream; and the above apparatus for playing back a digital media stream on the playback side of the digital media stream.

The present invention may also be embodied in a computer readable medium for storing a computer program comprising instructions for carrying out the steps of any of the above methods.

Using the method and system for preventing skipping the playback of a special content section of a digital media stream during the playback of the digital media stream, not only skipping the playback of the special content section of the digital media stream on any media player can be avoided, but also the process in the prior art of decoding the content of the special content section, embedding an encryption key therein, and re-encoding the special content section can be avoided, thus saving the cost of media content production, avoiding the content distortions and damage due to the re-encoding, and keeping the size of the media content not to increase.

BRIEF DESCRIPTION OF THE ACCOMPANYING DRAWINGS

The present invention and its preferred embodiments, features and advantages can be better understood by referring to the following detailed description when read in conjunction with the accompanying drawings, in which.

PREFERRED EMBODIMENTS OF THE PRESENT INVENTION

Below the principles and particular implementations of the present invention will be described in detail by reference to the drawings, it should be noted, however, that the drawings and detailed description are intended only to illustrate the implementation of the present invention, enabling those skilled in the art to understand and implement the present invention, and not to limit the present invention in terms of the method steps and system components. It will be understood by those skilled in the art that various modifications, additions, and deletions can be made to the described steps of the method and components of the system without departing from the scope and spirit of the present invention.

Figure 2:
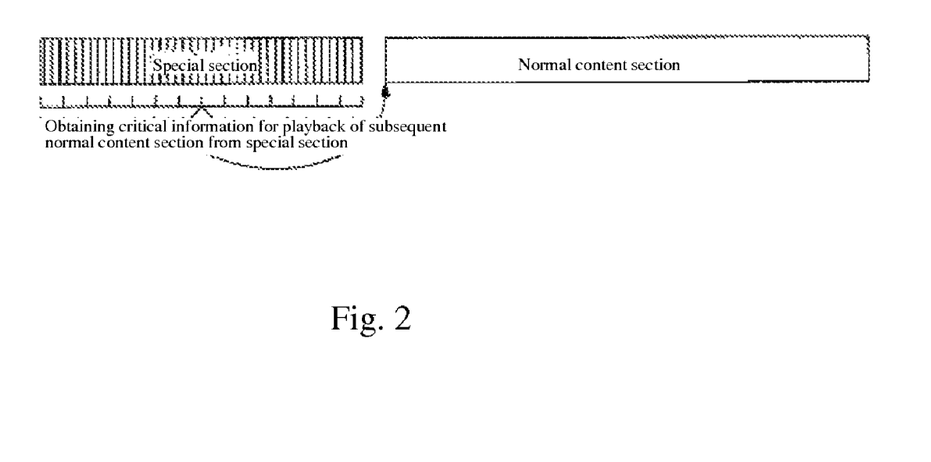
FIG. 2 is a schematic diagram illustrating the principles of the present invention.

FIG. 2 schematically illustrates the principles of the present invention. As shown, the principles of the present invention are that: obtaining certain information from a special content section such as commercial advertisements, copyright notices etc. in a media stream which are required to be played back before the playback of the normal content in the media stream during the decoding/playback process of the special content section, the information being critical for the decoding/playback of the normal content section. Thus, before playing back the normal content section of the media stream, the special content section must first be decoded/played back in order to obtain the critical information. And the special content section must be fully decoded to obtain the critical information. In an embodiment of the present invention, this critical information is an encryption key for the normal content section. And moreover, the encryption key is obtained by applying a mathematic method on the decoded special content section, rather than having been placed in the special content section in advance, thus the content of the special content section has not been tampered with in any way, so that the disadvantages of increased cost, content distortions, and increased data size etc. caused by the process of decoding the content of the special section, embedding the encryption key therein, and re-encoding the content of the special section in the prior art are avoided. Other examples of the critical information include important decoding parameters, such as quantization factors, global values, etc.

As such, according to the present invention, specific processes need to be performed on the providing side of media content and the playback side of media content.

Figure 3:
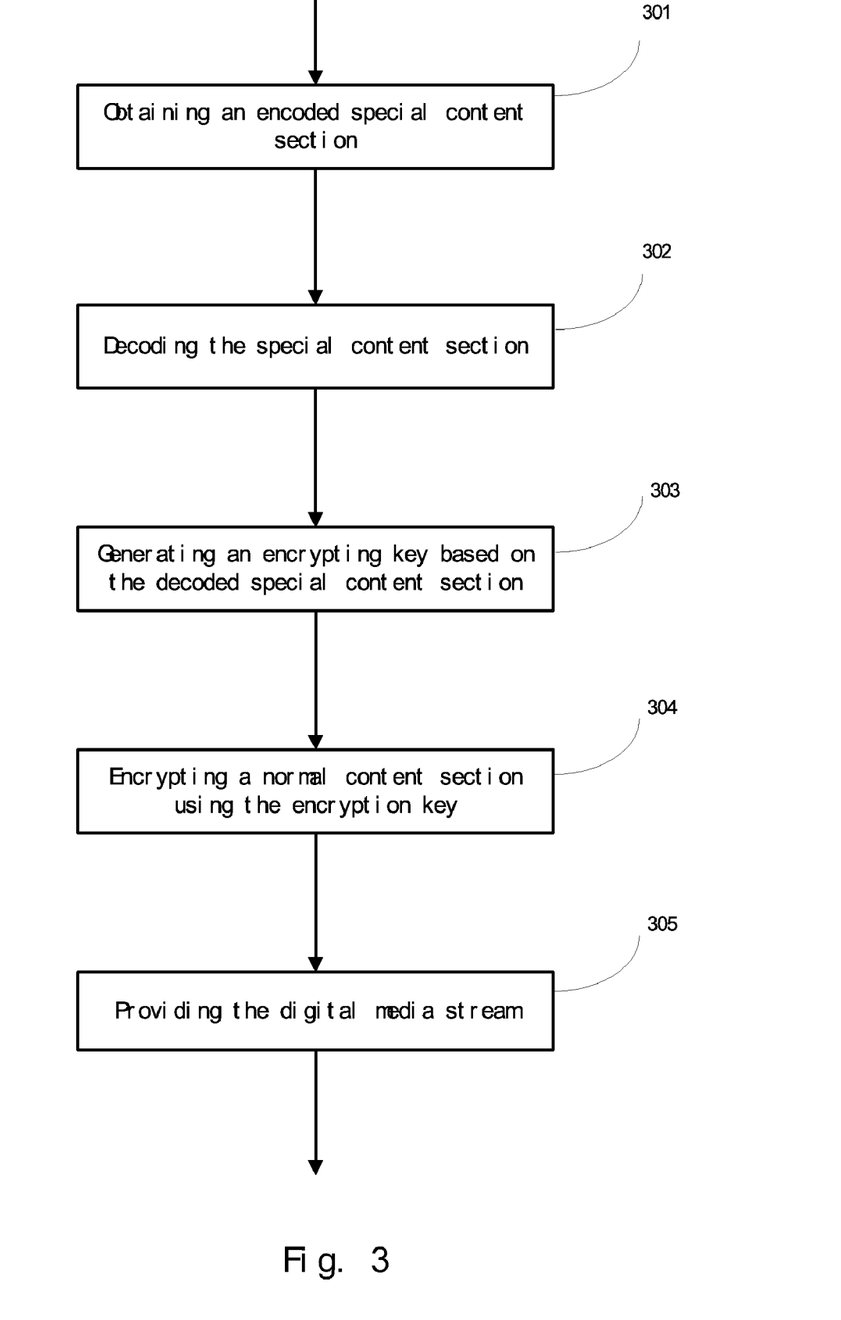
FIG. 3 is a flow diagram of the process on the providing side of a digital media stream in a method for preventing skipping the playback of a special content section of the digital media stream according to an embodiment of the present invention.

FIG. 3 shows a flow diagram of the process at the providing side of a digital media stream of a method for preventing skipping the playback of a special content section according to an embodiment of the present invention. As shown, in step 301, the encoded special content section of the digital media stream comprising the special content section and a normal content section is obtained, the special content section having to be played back as required by the producer, owner, provider of the digital media stream or by law. This obtaining step can either comprise obtaining the encoded special content section of the digital media stream, or comprise obtaining the special content section not yet encoded of the digital media stream, and then encoding the special content section. The encoding can be that of any format known to those skilled in the art or to be developed in the future. In step 302, the special content section is decoded. In step 303, an encryption key is generated based on all or a selected part of the decoded data of the special content section. The encryption key can be generated by using some mathematic method, such as by calculating some statistical characteristics or some arithmetic values of the decoded data of the special content section. In the case where the digital media stream is video or image data, an example of the step is to use histogram data of the decoded data of the special content section.

Figure 5:
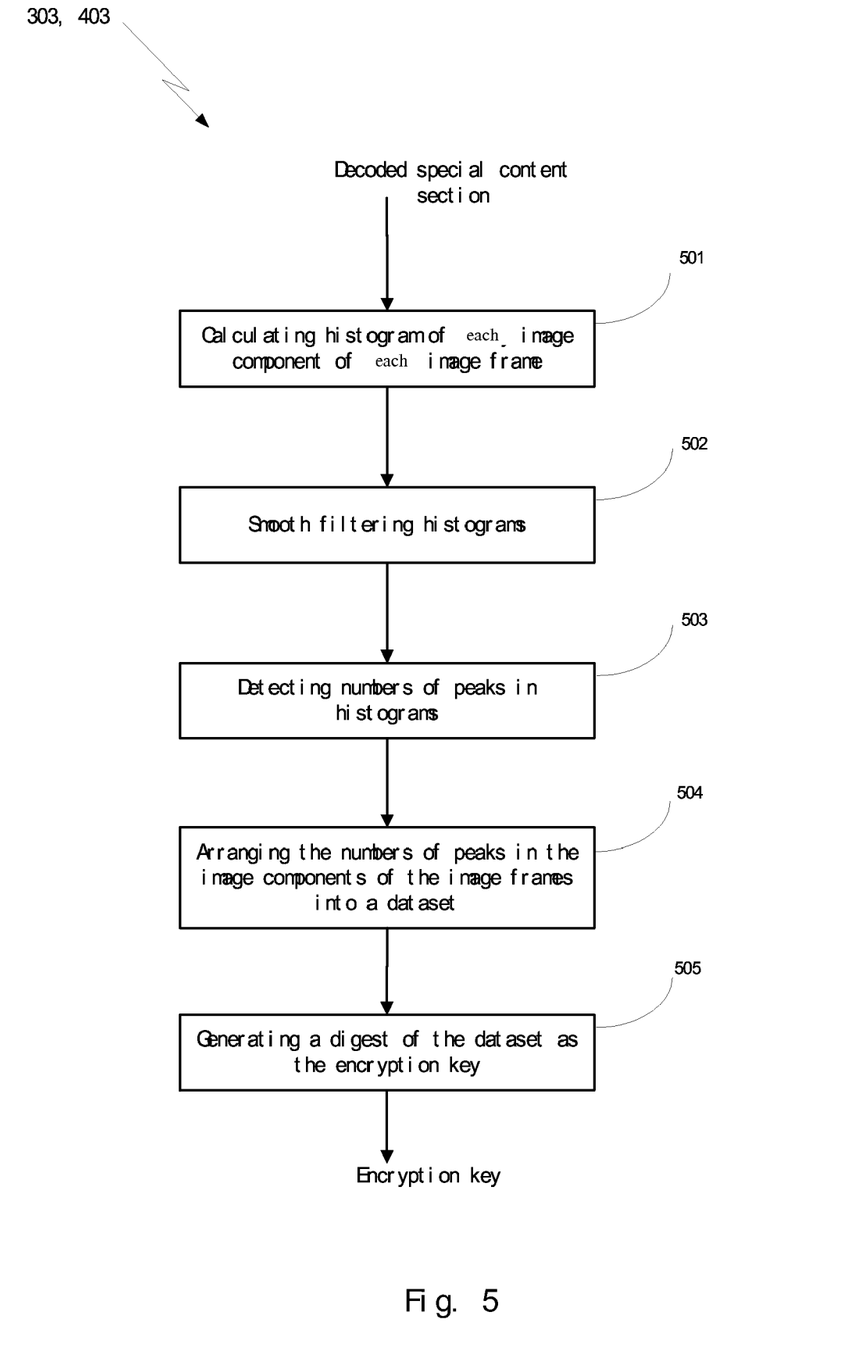
FIG. 5 is a flow diagram of a method for obtaining an encryption key by generating histogram data of the decoded data of a special content section in the method for preventing skipping the playback of a special content section according to an embodiment of the present invention.

As an exemplary detailed depiction of step 303, FIG. 5 illustrates a method for obtaining an encryption key by generating histogram data of the decoded data of the special content section according to an embodiment of the present invention. As shown, in step 501, for every image frame in the decoded data of the special content section, the histogram of each of its image components is statistically calculated. Only by way of example, here assume that the decoded video is in YUV format; for other image formats, the process is similar. For each frame of the decoded image, the histograms of its Y, U, and Y components are statistically calculated. In step 502, the Y, U, and Y histograms (e.g., by using a median filter with a diameter of 7) are smooth-filtered in order to eliminate the effect of image noises. In step 503, the number of peaks in the Y, U, and V diagrams are detected, which are Yp, Up, and Vp respectively, and expressed by 8 bits. For a detection algorithm, reference can be made to M. I. Sezan, A peak detection algorithm and its application to histogram-based image data reduction, Computer Vision, Graphics, and Image Processing 49:36-51 (1990). In step 504, Yp, Up, and Vp of all image frames are arranged sequentially to form a dataset X. In step 505, the dataset X is digested using an algorithm such as MD5, getting a digest Z of 128 bits. This digest Z will be used as an encryption key for encrypting the subsequent normal content section.

As will be understood by those skilled in the art, what is described above is only an example of a method for generating an encryption key by using the histogram data of video or image data, and there are many other methods for generating an encryption key by using the histogram data, all of which are within the spirit and scope of the present invention.

Returning to FIG. 3, in step 304, the normal content section is encrypted using the generated encryption key. The encryption method can be any of a variety of encryption methods known to those skilled in the art or to be developed in the future. In step 305, the digital media stream comprising the encoded special content section and encrypted normal content section is provided. The providing step may comprise providing the digital media stream through wireless or wired communication networks such as Internet, or may comprises providing the digital media stream via a portable signal bearing media such as CD-ROM, DVD, floppy disk, hard disk drive, flash memory disk etc.

The process on the providing side of the digital media stream of the above described method for preventing skipping the playback of a special content section of the digital media stream of the present invention may either be incorporated in a conventional process of creating or providing a digital media stream, as part thereof, in which case, some steps of the above described method such as the providing step can be steps in the conventional process of creating or providing a digital media stream; or be a separate process used specially for performing the processing according to the present invention on a conventional digital media stream as already provided by a conventional process of creating or providing a digital media stream.

Figure 4:
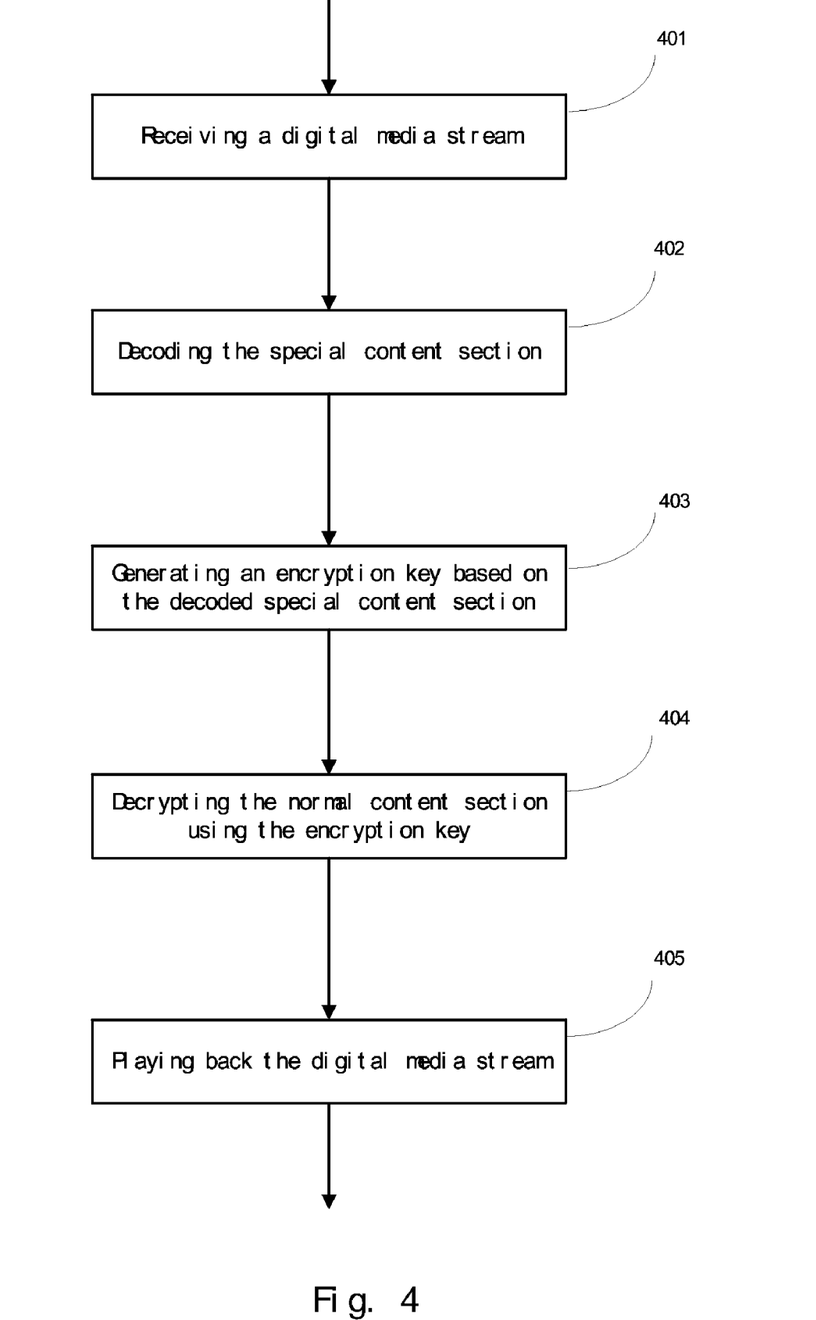
FIG. 4 is a flow diagram of the process on the playback side of a digital media stream in a method for preventing skipping the playback of a special content section of the digital media stream according to an embodiment of the present invention.

FIG. 4 shows a flow diagram of the process at the playback side of a digital media stream of a method for preventing skipping the playback of a special content section according to an embodiment of the present invention. As shown, at the playback side of a digital media stream, in step 401, a digital media stream which has been processed by the process as shown in FIG. 3 and comprises an encoded special content section and encrypted normal content section is received. The receiving step can be performed through wireless or wired communication networks such as Internet, or through a signal bearing medium such as CD-ROM, DVD, floppy disk, hard disk drive, flash memory disk etc. In step 402, the special content section required to be played back in the digital media stream is decoded. In step 403, an encryption key is generated based on the decoded data of the special content section by using the same method as used on the providing side for generating an encryption key based on the decoded data of the special content section. The encryption key can be generated by using some mathematical method, such as by calculating some statistical characteristics or arithmetic values of the decoded data of the special content section. In the case where the digital media stream is video or image data, an example of this step is to use histogram data of the decoded special content section. As an exemplary detailed description of step 403, reference can be made to the method for obtaining an encryption key by generating histogram data of the decoded data of the special content section according to an embodiment of the present invention as shown in in FIG. 5 and the relevant description hereinabove. In step 404, the normal content section of the digital media stream is decrypted using the encryption key. In step 405, the special content section and normal content section of the digital media stream is played back.

The process on the playback side of the digital media stream of the above described method for preventing skipping the playback of a special content section of the digital media stream of the present invention may either be incorporated in a conventional process of playback of a digital media stream, as part thereof, in which case, some steps of the above described method such as the receiving step 401 and the playback step 405 can be steps in the conventional process of playback of a digital media stream; or be a separate process used specially for playing back the digital media stream which has been processed by the process on the providing side of the digital media stream of the method for preventing skipping the playback of a special content section of a digital media stream according to the present invention.

Taking a stored digital video application such as DVD as an example, if the content provider wants to show some advertisements or legal declarations before the movie starts, the method of this invention can be used to make sure these contents can not be skipped. That is, an encryption key, for example, an 128 bits AES key, generated using the decoded data of these special contents can be used to encrypt the movie content section. As the encryption key is generated from statistical data of the decoded frames in the advertisement or legal declaration section, the player can only extract that data when it plays back the advertisement and legal declaration section. Thus the player can not skip the special section and show the succeeding movie even if it is hacked to be non-standard-conforming.

Figure 6:
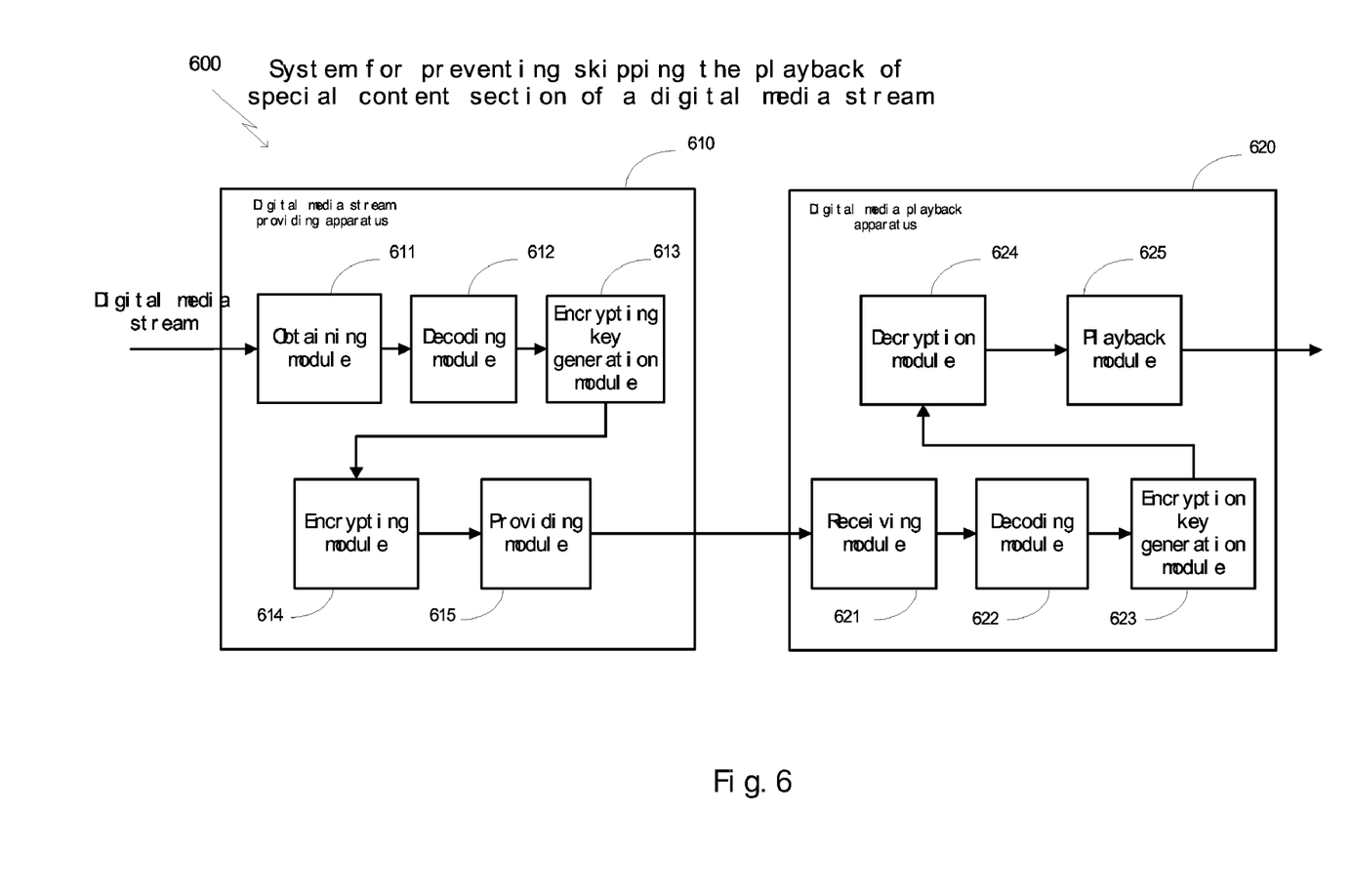
FIG. 6 is a block diagram illustrating a system for preventing skipping the playback of a special content section of a digital media stream according to an embodiment of the present invention.

FIG. 6 shows a system 600 for preventing skipping the playback of a special content section of a digital media stream according to an embodiment of the present invention. As shown, the system 600 comprises a digital media stream providing apparatus 610 on the providing side of the digital media stream and a digital media stream playback apparatus 620 on the playback side of the digital media stream. The digital media stream providing apparatus 610 comprises: an obtaining module 611 for obtaining an encoded special content section of a digital media stream comprising the special content section and a normal content section; an decoding module 612 for decoding the encoded special content section required to be played back of the obtained digital media stream, generating the decoded data of the special content section; an encryption key generation module 613 for generating the encryption key based on all or a selected part of the decoded data of the special content section; an encryption module 614 for encrypting the normal content section of the digital media stream using the encryption key; and a providing module 615 for providing the digital media stream comprising the encoded special content section and encrypted normal content section.

Wherein, the obtaining module 611 can either be configured to obtain a special content section of an encoded digital media stream, or be configured to obtain a special content section of a digital media stream not yet encoded, and then encode the special content section. The encoding can be of any format already known to those skilled in the art or to be developed in the future. The encryption module 614 can use any of a variety of encryption methods already known to those skilled in the art or to be developed in the future. The providing module 615 can either comprises providing the digital media stream through wireless or wired communication networks such as Internet, or comprises providing the digital media stream through a signal bearing medium such as a CD-ROM, DVD, floppy disk, hard disk drive, flash memory disk etc.

The digital media stream providing apparatus 610 on the providing side of a digital media stream of the system 600 of the present invention for preventing skipping the playback of a special content section of a digital media stream can either be incorporated in a conventional digital media stream creating or providing system, as part thereof, in which case, some modules of the digital media stream providing apparatus of the present invention, such as the providing module 615, can be modules in the conventional digital media stream creating or providing system; or be a standalone apparatus used specially for performing the processing according to the present invention on a conventional digital media stream as provided by a conventional digital media stream creating or providing system.

The digital media stream playback apparatus 620 on the playback side of a digital media stream of the system 600 of the present invention comprises: a receiving module 621 for receiving a digital media stream as provided by the above described method according to the present invention; a decoding module 622 for decoding a special content section of the received digital media stream to produce the decoded data of the special content section; an encryption generation module 623 for generating an encryption key based on all or selected part of the decoded data of the special content section by using the same method as used by the encryption key generation module of the above described digital media stream providing apparatus 610; a decryption module 624 for decrypting a normal content section of the digital media stream using the encryption key; and a playback module 625 for playing back the special content section and normal content section of the digital media stream.

The digital media stream playback apparatus 620 on the playback side of a digital media stream of the system 600 of the present invention for preventing skipping the playback of a special content section of a digital media stream can either be incorporated in a conventional digital media stream playback apparatus, as part thereof, in which case, some modules of the digital media stream playback apparatus 620 of the present invention, such as the receiving module 621 and the playback module 625, can be modules in the conventional digital media stream playback apparatus; or be a standalone apparatus used specially for playing back a digital media stream as already processed by the process on the providing side of the method of the present invention for preventing skipping the playback of a special content section of a digital media stream.

Preferably, the encryption key generation modules 613 and 623 in the digital media stream providing apparatus 610 and digital media stream playback apparatus 620 in the system 600 of the present invention can be configured to obtain the encryption key by applying some mathematic method on the decoded data of a special content section, such as by calculating some statistical characteristics or some arithmetic values of the decoded data of the special content section. In the case where the digital media stream is video or image data, the encryption key generation modules 613, 623 can be configured to obtain the encryption key by generating histogram data of the decoded data of the special content section.

Figure 7:
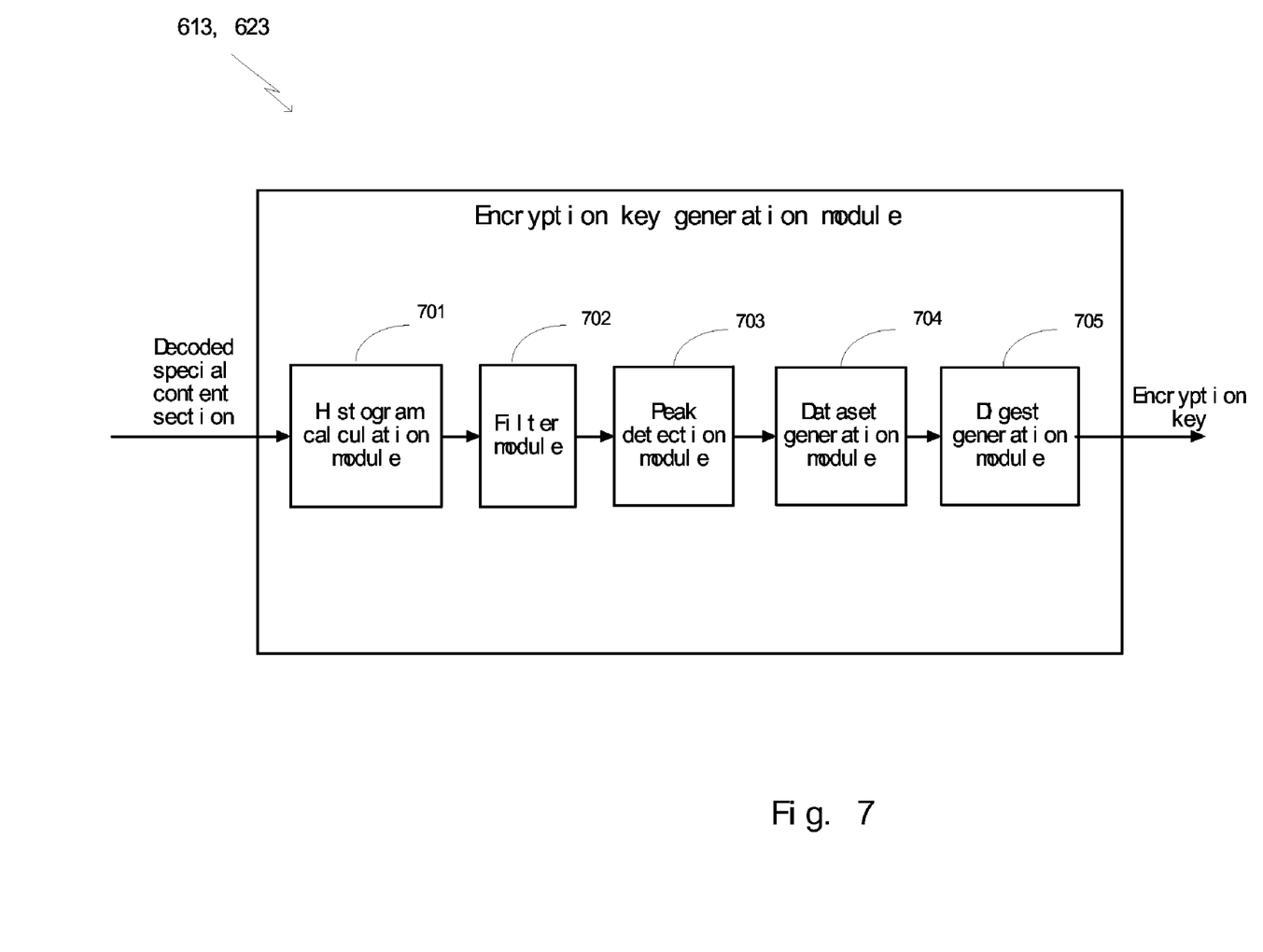
FIG. 7 is a block diagram illustrating the encryption key generation module configured for obtaining an encryption key by generating histogram data of the decoded data of a special content section in the system for preventing skipping the playback of a special content section of a digital media stream according to an embodiment of the present invention.

In particular, FIG. 7 shows a block diagram illustrating the encryption key generation modules 613, 623 configured for obtaining an encryption key by generating histogram data of the decoded data of a special content section. As shown, the encryption key generation module 613, 623 comprises: a histogram calculation module 701 for statistically calculating the histogram of each image component of each image frame in the received decoded data of a special content section; a filter module 702 for smooth filtering the histogram of each image component in order to eliminate the effect of image noises; a peak detection module 703 for detecting the number of peaks in the histogram of each image component; a dataset generation module 704 for arranging the detected numbers of peaks in the histograms of the image components of the image frames into a dataset; and a digest generation module 705 for generating a digest of the dataset as the encryption key.

In another aspect of the present invention, there is provided a method for providing a digital media stream which can prevent skipping the playback of a special content section during the playback of the digital media stream. The method is the same as the process on the providing side of a digital media stream of the method of the present invention for preventing skipping the playback of a special content section of a digital media as described above, and the description thereof will be omitted here.

In still another aspect of the present invention, there is provided an apparatus for providing a digital media stream which can prevent skipping the playback of a special content section during the playback of the digital media stream. The apparatus is the same as the digital media stream providing apparatus 610 on the providing side of a digital media stream of the system 600 of the present invention for preventing skipping the playback of a special content section of a digital media as described above, and the description thereof will be omitted here.

In yet another aspect of the present invention, there is provided a method for playing back a digital media stream as provided by the above method for providing a digital media stream. This method is the same as the process on the playback side of a digital media stream of the method of the present invention for preventing skipping the playback of a special content section of a digital media stream as described above, and the description thereof will be omitted here.

In a further aspect of the present invention, there is provided an apparatus for playing back a digital media stream as provided by the above method for providing a digital media stream. This apparatus is the same as the digital media playback apparatus 620 on the playback side of a digital media stream of the system 600 of the present invention for preventing skipping the playback of a special content section of a digital stream as described above, and the description thereof will be omitted here.

The digital media stream suitable for the present invention may be any kind of digital media stream, including audio stream, video stream, etc, and may be in any format; the present invention has no limitation whatsoever in this respect.

The present invention can be realized in hardware, software, or a combination of hardware and software. The present invention can be realized in a centralized fashion in one computer system or in a distributed fashion where different elements are spread across several interconnected computer systems. Any kind of computer system or other apparatus adapted for carrying out the methods described herein is suited. A typical combination of hardware and software can be a general-purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods.

While the present invention has been presented and described in detail with reference to the embodiments, it will be understood by those skilled in the art that modifications may be made therein both in form and in details without departing from the spirit and scope of the present invention. For example, the system and apparatus of the present invention may have more, less or different modules; these modules may be combined in various manners, some of them may be split further, or have different connecting relationships; The various methods of the present invention may have more, less or different steps; these steps may be in different orders, some of them may be split further, or may be performed in parallel. All these variations are within the spirit and scope of the present invention; the scope of the present invention is defined by the appended claims.

The invention claimed is:

1. A computer-implemented method comprising:
   providing a first digital media stream including one of a video and an image data stream, said first digital media stream including an encoded first content section and a second content section, wherein the first content section comprises a plurality of image frames, each said plurality of image frames further comprising image components;
   decoding, by a computing device, the encoded first content section;
   generating, by said computing device, a first encryption key based on the decoded first content section, wherein said generating said first encryption key comprises:
      calculating, by said computing device, a histogram of an image component for each image frame in the decoded first content section;
      eliminating image noise by smooth-filtering, by said computing device, each histogram of the image components for each image frame;
      detecting, by said computing device, a number of peaks in each histogram of the image components for each image frame;
      arranging, by said computing device, the detected number of peaks in each histogram of the image components for each image frame into a dataset; and
      generating, by said computing device, a digest of the dataset as said first encryption key;
   encrypting, by said computing device, the second content section of the first digital media stream using the first encryption key; and
   providing, by said computing device, a second digital media stream comprising the encoded first content section and the encrypted second content section.

2. The method of claim 1, further comprising generating the first encryption key based on a selected part of the decoded first content section.

3. A computer-implemented method comprising:
   providing a first digital media stream including one of a video and an image data stream, said first digital media stream including an encoded first content section and a second content section, wherein the first content section comprises a plurality of image frames, each of said plurality of image frames further comprising image components;
   decoding, by a computing device, the encoded first content section;
   generating, by said computing device, a first encryption key based on the decoded first content section, wherein said generating said first encryption key comprises:
      calculating, by said computing device, a histogram of an image component for each image frame in the decoded first content section;
      eliminating image noise by smooth-filtering, by said computing device, each histogram of the image components for each image frame;
      detecting, by said computing device, a number of peaks in each histogram of the image components for each image frame;
      arranging, by said computing device, the detected number of peaks in each histogram of the image components for each image frame into a dataset; and
      generating, by said computing device, a digest of the dataset as said first encryption key;
   encrypting, by said computing device, the second content section of the first digital media stream using the first encryption key;
   providing, by said computing device, a second digital media stream comprising the encoded first content section and the encrypted second content section;
   receiving the second digital media stream;
   decoding, by a computing device, the encoded first content section of the second digital media stream;
   generating, by said computing device, a second encryption key based on the decoded first content section of the second digital media stream based on said generating the first encryption key in providing the digital media;
   decrypting, by said computing device, the second content section of the digital media stream using the second encryption key; and
   playing back, by a second computing device, the decoded first content section of the second digital media stream and the second content section of the second digital media stream.

4. The method of claim 3, wherein said generating the second encryption key based on the decoded first content section generates the second encryption key based on a selected part of the decoded first content section.

5. The method of claim 3, wherein said generating the second encryption key based on the decoded first content section obtains the second encryption key by calculating one of statistical characteristics and arithmetic values of the decoded first content section.

6. The method of claim 5, wherein the second digital media stream is one of a video or and an image data stream, and wherein said obtaining the second encryption key by calculating one of statistical characteristics or and arithmetic values of the decoded first content section obtains the second encryption key by generating histogram data of the decoded first content section.

7. The method of claim 6, wherein said obtaining the second encryption key by generating histogram data of the decoded first content section comprises:
   for each image frame in the decoded first content section, calculating, by said computing device, the histogram of its each image component; eliminating image noise by smooth-filtering, by said computing device, the histogram of the each image component;
   detecting, by said computing device, the number of peaks in the histogram of the each image component;
   arranging, by said computing device, the number of peaks in the histograms of the image components of the image frame into a dataset; and
   generating, by said computing device, a digest of the dataset as the encryption key.

8. A computer-implemented method comprising:
   providing a first digital media stream on the providing side of the first digital media stream, said first digital media stream including one of a video and an image data stream and including an encoded first content section and a second content section, wherein the first content section comprises a plurality of image frames, each of said plurality of image frames further comprising image components, said providing said first digital media stream further comprising:
      decoding, by a computing device, an encoded first content section of said digital media stream;
      generating, by said computing device, a first encryption key based on the decoded first content section comprising:
         calculating, by said computing device, a histogram of an image component for each image frame in the decoded first content section;
         eliminating image noise by smooth-filtering, by said computing device, each histogram of the image components for each image frame;
         detecting, by said computing device, a number of peaks in each histogram of the image components for each image frame;
         arranging, by said computing device, the detected number of peaks in each histogram of the image components for each image frame into a dataset; and
         generating, by said computing device, a digest of the dataset as said first encryption key;
      encrypting, by said computing device, a second content section of the digital media stream using the first encryption key; and
   providing, by said computing device, a second digital media stream comprising the encoded first content section and the encrypted second content section; and
   playing back said second digital media stream on a playback side of the digital media stream, said playing back said second digital media stream further comprising:
      receiving the second digital media stream;
      decoding, by said computing device, the encoded first content section of the second digital media stream;
      generating, by said computing device, a second encryption key based on the decoded first content section comprising:
         calculating, by said computing device, a histogram of an image component for each image frame in the decoded first content section;
         eliminating image noise by smooth-filtering, by said computing device, each histogram of the image components for each image frame;
         detecting, by said computing device, a number of peaks in each histogram of the image components for each image frame;
         arranging, by said computing device, the detected number of peaks in each histogram of the image components for each image frame into a dataset; and
         generating, by said computing device, a digest of the dataset as said second encryption key;
      decrypting, by said computing device, the second content section of the digital media stream using the second encryption key; and
   playing back, by said computing device, the decoded data of first content section and second content section of the digital media stream.

9. A computer system comprising:
   a computing device; and
   computer storage, said computer storage storing executable instructions that, when executed by said computing device, cause said computing device to perform:
      providing a first digital media stream including one of a video stream and an image data stream, said first digital media stream including an encoded first content section and a second content section, wherein the first content section comprises a plurality of image frames, each of said plurality of image frames further comprising image components;
      decoding said encoded first content section of said first digital media stream;
      generating a first encryption key based on decoding said first content section, said encryption key generation comprising:
         calculating a histogram of each image component of each image frame in the decoded data of the first content section;
         eliminating image noise by smooth-filtering the histogram of the each image component;
         detecting the number of peaks in the histogram of the each image component;
         arranging the number of peaks in the histograms of the image components of the image frame into a dataset; and
         generating a digest of the dataset as the second encryption key;
      encrypting said second content section of the first digital media stream using the first encryption key; and
      providing a second digital media stream comprising the encoded first content section and the encrypted second content section.

10. The computer system of claim 9, wherein said generating said first encryption key is based on a selected part of the decoded first content section.

11. A computer system, said computer system comprising:
   a computing device; and
   computer storage, said computer storage storing executable instructions that, when executed by said computing device, cause said computing device to perform:
      providing a first digital media stream including one of a video and an image data stream, said first digital media stream including an encoded first content section and a second content section, wherein the first content section comprises a plurality of image frames, each of said plurality of image frames further comprising image components;

decoding, by a computing device, the encoded first content section;
generating, by said computing device, a first encryption key based on the decoded first content section, wherein said generating said first encryption key comprises:
  calculating, by said computing device, a histogram of an image component for each image frame in the decoded first content section;
  eliminating image noise by smooth-filtering, by said computing device, each histogram of the image components for each image frame;
  detecting, by said computing device, a number of peaks in each histogram of the image components for each image frame;
  arranging, by said computing device, the detected number of peaks in each histogram of the image components for each image frame into a dataset; and
  generating, by said computing device, a digest of the dataset as said first encryption key;
encrypting, by said computing device, the second content section of the first digital media stream using the first encryption key;
providing, by said computing device, a second digital media stream comprising the encoded first content section and the encrypted second content section;
receiving the second digital media stream;
decoding the first content section of the second digital media stream;
generating a second encryption key based on the decoded first content section by using the same method for generating the first encryption key in providing the digital media;
decrypting the second content section of the digital media stream using the encryption key; and
playing back the first content section and second content section of the digital media stream.

12. The computer system of claim 11, wherein said generating the second encryption key based on a selected part of decoded first content section.

13. The computer system of claim 11, wherein said generating the second encryption key further comprises generating histogram data of the decoded first content section, said generating histogram data further comprises:
calculating the histogram of each image component of each image frame in the decoded first content section;
eliminating image noise by smooth-filtering the histogram of the each image component;
detecting the number of peaks in the histogram of the each image component;
arranging a number of peaks in the histograms of the image components of the image frame into a dataset; and
generating a digest of the dataset as the second encryption key.

14. A system comprising:
a first apparatus that provides a first digital media stream on the providing side of the digital media stream, said apparatus comprising:
  a first computing device; and
  first computer storage, said first computer storage storing executable instructions that, when executed by said first computing device, cause said first computing device to perform:
    decoding an encoded first content section of said digital media stream;
    generating a first encryption key based on the decoded first content section, said generating further comprising:
      calculating the histogram of each image component of each image frame in the decoded first content section;
      eliminating image noises by smooth-filtering the histogram of the each image component;
      detecting the number of peaks in the histogram of the each image component;
      arranging the number of peaks in the histograms of the image components of the image frame into a dataset; and
      generating a digest of the dataset as the second encryption key;
    encrypting a second content section of the digital media stream using the first encryption key; and
    providing a second digital media stream comprising the encoded first content section and the encrypted second content section; and
a second apparatus that plays back a second digital media stream on the playback side of the digital media stream, said second apparatus comprising:
  a second computing device; and
  second computer storage, said second computer storage storing executable instructions that, when executed by said second computing device, cause said second computing device to perform:
    receiving the second digital media stream;
    decoding the first content section of the second digital media stream;
    generating a second encryption key based on the decoded first content section by generating the first encryption key in providing the first digital media;
    decrypting the second content section of the second digital media stream using the second encryption key; and
    playing the first content section and second content section of the second digital media stream.

15. A program storage medium readable by a machine, tangibly embodying a program of instructions when executed by said machine cause said machine to perform the steps of:
decoding an encoded first content section of a digital media stream;
generating an encryption key based on the decoded first content section comprising:
  calculating, by said computing device, a histogram of an image component for each image frame in the decoded first content section;
  eliminating image noise by smooth-filtering, by said computing device, each histogram of the image components for each image frame;
  detecting, by said computing device, a number of peaks in each histogram of the image components for each image frame;
  arranging, by said computing device, the detected number of peaks in each histogram of the image components for each image frame into a dataset; and
  generating, by said computing device, a digest of the dataset as said first encryption key;
encrypting a second content section of the digital media stream using the encryption key; and
providing a second digital media stream comprising the encoded first content section and the encrypted second content section.

* * * * *